United States Patent Office.

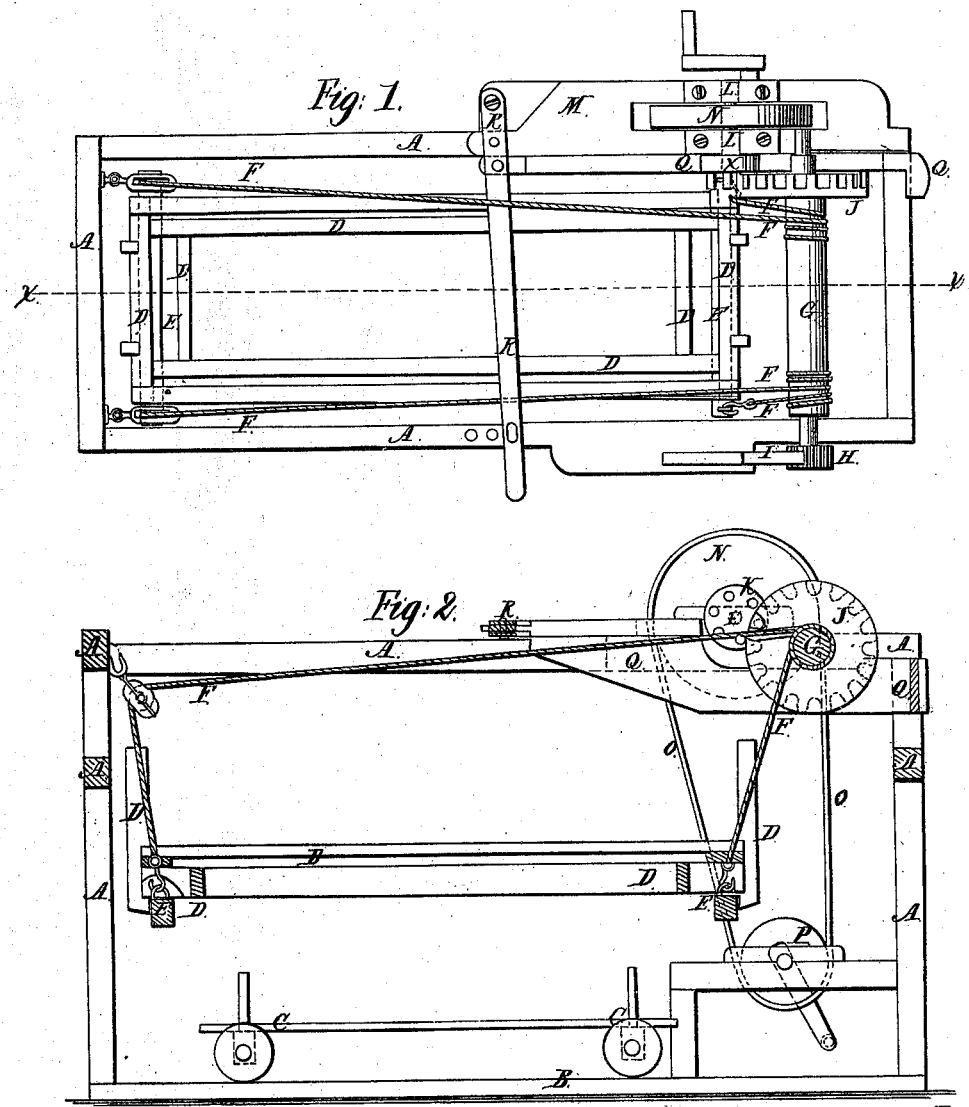

JOHN DENNIS, OF OSWEGO, NEW YORK.

Letters Patent No. 95,006, dated September 21, 1869.

IMPROVEMENT IN HAY AND GRAIN-ELEVATORS.

The Schedule referred to in these Letters Patent and making part of the same.

*To all whom it may concern:*

Be it known that I, JOHN DENNIS, of Oswego, in the county of Oswego, and State of New York, now temporary residing at Newmarket, in the county of York, in the province of Ontario, and Dominion of Canada, have invented a new and improved Hay and Grain-Elevator; and I do hereby declare that the following is a full, clear, and exact description thereof, which will enable others skilled in the art to make and use the same, reference being had to the accompanying drawings, forming part of this specification, in which—

Figure 1 is a top view of my improved apparatus, as applied to the frame-work of a barn.

Figure 2 is a detail sectional view of the same, taken through the line x x, fig. 1.

Similar letters of reference indicate corresponding parts.

My invention has for its object to furnish an improved apparatus, by means of which an entire load of hay or grain may be raised to the upper part of a barn at one operation, thereby saving the labor and time required when it is pitched up or raised by the forkfull; and It consists in the construction and combination of the various parts of the apparatus by means of which the load of hay or grain is raised, as hereinafter more fully described.

A represents the frame of a barn, and

B represents the barn-floor, about the construction of which parts there is nothing new.

C is an ordinary farm-wagon.

D is the hay or grain-rack, about the construction of which there is nothing new, except that the front and rear stakes of the said rack should project a little below the sills, as shown in fig. 2, or the lower sides of the ends of said sills should have projections formed upon or attached to them, to serve as guards or stops to the cross-bar E, when placed beneath the ends of the said sills.

To the ends of the bars E are detachably attached the lower ends of the ropes or chains F, by means of hooks and staples or eye-bolts, or in any other convenient manner.

The ropes or chains F pass over guide-pulleys suspended in suitable positions from the frame A, and their upper ends are attached to the drum or shaft G, the journals of which revolve in bearings in the frame A.

The shaft G may, if desired or convenient, be placed near one side of the frame, so that only two of the ropes or chains will require guide-pulleys.

To one end of the shaft G is attached a ratchet-wheel, H, upon the teeth of which rests the pawl I, which is pivoted or hinged to the frame A, or to some suitable support attached to said frame.

To the other end of the shaft G is attached a gear-wheel, J, the teeth of which are so formed as to leave the face of the wheel smooth, for the application of a brake.

Into the teeth of the gear-wheel J mesh the teeth of the small gear-wheel K, attached to the end of the short shaft L, which revolves in bearings attached to the frame or plate M, which slides in ways upon the frame A, to enable the gear-wheel K to be thrown out of and into gear with the gear-wheel J when required.

To the short shaft L is attached a pulley, N, around which passes a belt, O, which belt also passes around a pulley, P, pivoted to the frame A, or to some other suitable support, and to which motion may be given by hand or horse-power, as may be desired or convenient.

Q is a brake, which slides back and forth upon the frame A, or upon ways attached to said frame, so that it may be moved forward against or away from the wheel J, as required.

R is a lever, one end of which is pivoted to the frame A, or to some suitable support attached to said frame, and the other end of which extends out into such a position that it may be conveniently reached and operated.

To the lever R is pivoted the frame or plate M, and the brake Q, so the gear-wheel K may be moved out of and into gear with the gear-wheel J, at the same time and by the same operation that the brake Q is applied to and removed from the said gear-wheel J.

In using the apparatus, the bars E are placed under the ends of the sills of the rack D, and the power applied, raising the rack D, and the load upon it, to the desired height, where it is securely held by the pawl and ratchet I H.

The hay or grain is then unloaded, and the rack D is lowered, by means of the brake Q, to the wagon.

Having thus described my invention,

I claim as new, and desire to secure by Letters Patent—

1. A machine, whose mode of operation is substantially as shown and described.

2. The combination of the bars E, ropes or chains F, shaft or drum G, gear-wheel J, gear-wheel K, pulley N, band O, and pulley P, substantially as herein shown and described, and for the purpose set forth.

3. The combination of the sliding frame or plate M, brake Q, and lever R, with the gear-wheel J, substantially as herein shown and described, and for the purpose set forth.

The above specification of my invention signed by me, this 8th day of June, 1869.

JOHN DENNIS.

Witnesses:
GEO. H. BACHE,
JOHN COOK.